(12) United States Patent
Kim et al.

(10) Patent No.: US 12,202,546 B2
(45) Date of Patent: Jan. 21, 2025

(54) VEHICLE REAR STRUCTURE

(71) Applicants: Hyundai Motor Company, Seoul (KR); Kia Corporation, Seoul (KR)

(72) Inventors: Young Eun Kim, Seoul (KR); Jun Hyoung Kim, Hanam-si (KR); Seong Hoon Ham, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 260 days.

(21) Appl. No.: 17/896,447

(22) Filed: Aug. 26, 2022

(65) Prior Publication Data

US 2023/0303180 A1 Sep. 28, 2023

(30) Foreign Application Priority Data

Mar. 25, 2022 (KR) .................. 10-2022-0037593

(51) Int. Cl.
  *B62D 25/04* (2006.01)
  *B62D 25/02* (2006.01)
  *B62D 25/08* (2006.01)
  *B62D 27/02* (2006.01)

(52) U.S. Cl.
  CPC ........... *B62D 25/04* (2013.01); *B62D 25/025* (2013.01); *B62D 25/087* (2013.01); *B62D 27/023* (2013.01)

(58) Field of Classification Search
  CPC ...... B62D 25/04; B62D 25/025; B62D 25/02; B62D 25/06; B62D 25/08; B62D 25/00; B62D 25/12; B62D 25/16

USPC .... 296/203.01, 203.03, 203.04, 193.06, 198, 296/193.05, 146.9, 0.11, 0.12
See application file for complete search history.

(56) References Cited

U.S. PATENT DOCUMENTS 7,819,429 B2 * 10/2010 Amano ................... B60R 22/24
                                                                    280/801.1

FOREIGN PATENT DOCUMENTS

| CN | 110341806 A | * | 10/2019 | ............ B60R 22/24 |
| JP | 2009073389 A | * | 4/2009 | |
| JP | 2020163950 A | * | 10/2020 | ............ B60R 22/24 |

OTHER PUBLICATIONS

CN110341806 Text (Year: 2019).*
JP2009-73389 Text (Year: 2009).*
JP2020163950 Text (Year: 2020).*

* cited by examiner

*Primary Examiner* — Dennis H Pedder
(74) *Attorney, Agent, or Firm* — Slater Matsil, LLP (57) ABSTRACT

An embodiment vehicle rear structure includes a rear pillar, including a rear pillar inner and a plurality of reinforcements mounted on the rear pillar inner. A component mounting bracket is attached to the rear pillar and has a receiving portion in which a portion of a vehicle component is received. The reinforcements are disposed to surround the component mounting bracket.

20 Claims, 11 Drawing Sheets

VEHICLE REAR STRUCTURE

CROSS-REFERENCE TO RELATED APPLICATIONS

This application claims the benefit of Korean Patent Application No. 10-2022-0037593, filed on Mar. 25, 2022, which application is hereby incorporated herein by reference.

TECHNICAL FIELD

The present disclosure relates to a vehicle rear structure.

BACKGROUND

As is known in the art, a vehicle rear structure includes a rear pillar, and the rear pillar defines a rear window opening in the inside thereof.

Some vehicles include a coach door or suicide door, and the rear of the coach door may be referred to as a rear-hinged door which is hinged at a vehicle rear body through a rear door hinge.

When the coach door is closed in a vehicle having a center pillar (referred to as B-pillar), the front of the coach door may be supported by the center pillar so that a load applied to the coach door may be transferred to the center pillar. In a vehicle having no center pillar (a center pillarless vehicle), the coach door may be held closed by a front door, and the coach door may be opened only when the front door is opened. That is, the coach door in the center pillarless vehicle may be opened and closed dependently on the front door. When the coach door is opened and closed dependently or is supported by the center pillar, the load on the rear door hinge may not increase.

In recent years, a dual-motion rear door hinge is being researched and developed to allow the coach door in the center pillarless vehicle to be opened and closed independently of the front door. The dual-motion rear door hinge may be configured to provide slide motion and swing motion, so the dual-motion rear door hinge may have a relatively complex structure with increased volume and weight. Accordingly, a vehicle rear structure is required to have enough stiffness and strength to stably support a relatively heavy vehicle component such as a dual-motion rear door hinge.

Since a vehicle rear structure according to the related art does not define load paths in various directions, a load may not be distributed and may be concentrated in a part thereof. Thus, the vehicle rear structure may be deformed or damaged due to an impact load generated during a vehicle impact/collision or the load generated by the heavy component.

The above information described in this background section is provided to assist in understanding the background of the inventive concept, and may include any technical concept which is not considered as the prior art that is already known to those skilled in the art.

SUMMARY

The present disclosure relates to a vehicle rear structure. Particular embodiments relate to a vehicle rear structure configured to stably support a relatively heavy component such as a dual-motion rear door hinge, and to distribute and transfer a load of the component in various directions.

Embodiments of the present disclosure can solve problems occurring in the prior art while advantages achieved by the prior art are maintained intact.

An embodiment of the present disclosure provides a vehicle rear structure configured to stably support a relatively heavy component such as a rear door hinge, and to distribute and transfer a load in various directions.

According to an embodiment of the present disclosure, a vehicle rear structure may include a rear pillar including a rear pillar inner and a plurality of reinforcements mounted on the rear pillar inner and a component mounting bracket attached to the rear pillar and having a receiving portion in which at least a portion of a vehicle component is received. The plurality of reinforcements may be disposed to surround the receiving portion of the component mounting bracket.

The vehicle component may be received in the receiving portion of the component mounting bracket, and the plurality of reinforcements may surround the receiving portion of the component mounting bracket so that a load generated by the vehicle component may be distributed and transferred in various directions, and thus mounting stiffness of the vehicle component in the component mounting bracket may be improved.

The receiving portion may be recessed from the component mounting bracket toward the interior of the vehicle.

As the receiving portion is recessed from the component mounting bracket toward the interior of the vehicle, at least a portion of the vehicle component may be located into the interior of the vehicle, and protruding of the vehicle component from the exterior of the vehicle may be minimized.

The plurality of reinforcements may include a front reinforcement located in front of the receiving portion of the component mounting bracket, a middle reinforcement located above the receiving portion of the component mounting bracket, and a lower reinforcement located behind the receiving portion of the component mounting bracket.

The front reinforcement, the middle reinforcement, and the lower reinforcement may be disposed around the receiving portion of the component mounting bracket so that the load generated by the vehicle component received in the receiving portion of the component mounting bracket may be distributed through the front reinforcement, the middle reinforcement, and the lower reinforcement.

A top end of the rear pillar may be connected to a roof side rail, a bottom end of the rear pillar may be connected to a side sill, the front reinforcement may extend along a rear edge of a door opening of the vehicle, and a bottom end of the front reinforcement may be fixed to the side sill.

The bottom end of the front reinforcement may be connected to the side sill so that connection stiffness between the rear pillar and the side sill may be improved.

A reinforcing member may be fixed to the bottom end of the front reinforcement, the reinforcing member and the bottom end of the front reinforcement may be fixed to the side sill, and the reinforcing member and the side sill may be configured to sandwich a portion of the bottom end of the front reinforcement.

Accordingly, the bottom end of the front reinforcement may be firmly connected to the side sill through the reinforcing member.

The front reinforcement, the middle reinforcement, and the lower reinforcement may define N-shaped load paths around the component mounting bracket.

Accordingly, the load generated by the vehicle component mounted in the component mounting bracket may be distributed through the N-shaped load paths, and thus strength and torsional stiffness of the rear pillar may be increased, and the vehicle component may be stably supported to prevent the sagging of a rear door.

The rear pillar inner may have an opening aligned with the receiving portion, and the front reinforcement, the middle reinforcement, and the lower reinforcement may define a space aligned with the opening of the rear pillar inner and the receiving portion.

The component mounting bracket may include an upper attachment portion attached to the rear pillar inner, and the receiving portion may be recessed from the upper attachment portion toward the interior of the vehicle so that the receiving portion may have a cavity in which the vehicle component is received.

The component mounting bracket may include a front flange provided on a front edge of the upper attachment portion, an upper flange provided on a top edge of the upper attachment portion, and a rear flange provided on a rear edge of the upper attachment portion.

The upper attachment portion may be attached to the rear pillar inner through the front flange, the upper flange, and the rear flange.

The vehicle rear structure may further include a rear wheel house connected to a lower portion of the rear pillar, the component mounting bracket may further include a lower attachment portion extending downwardly from the upper attachment portion, and the lower attachment portion may be attached to the rear wheel house.

The rear wheel house may have an opening into which the lower attachment portion is fitted.

The component mounting bracket may further include an upper mounting boss located above the receiving portion, a lower mounting boss located below the receiving portion, and a rear mounting boss located behind the receiving portion.

The upper mounting boss may protrude from the upper attachment portion toward the exterior of the vehicle, the lower mounting boss may protrude from the lower attachment portion toward the exterior of the vehicle, and the rear mounting boss may protrude from the upper attachment portion toward the exterior of the vehicle.

The vehicle component may include an upper flange fixed to the upper mounting boss, a lower flange fixed to the lower mounting boss, and a rear flange fixed to the rear mounting boss.

The vehicle rear structure may further include a rear side member located below the rear wheel house, and a lower portion of the lower attachment portion may be fixed to the rear side member.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
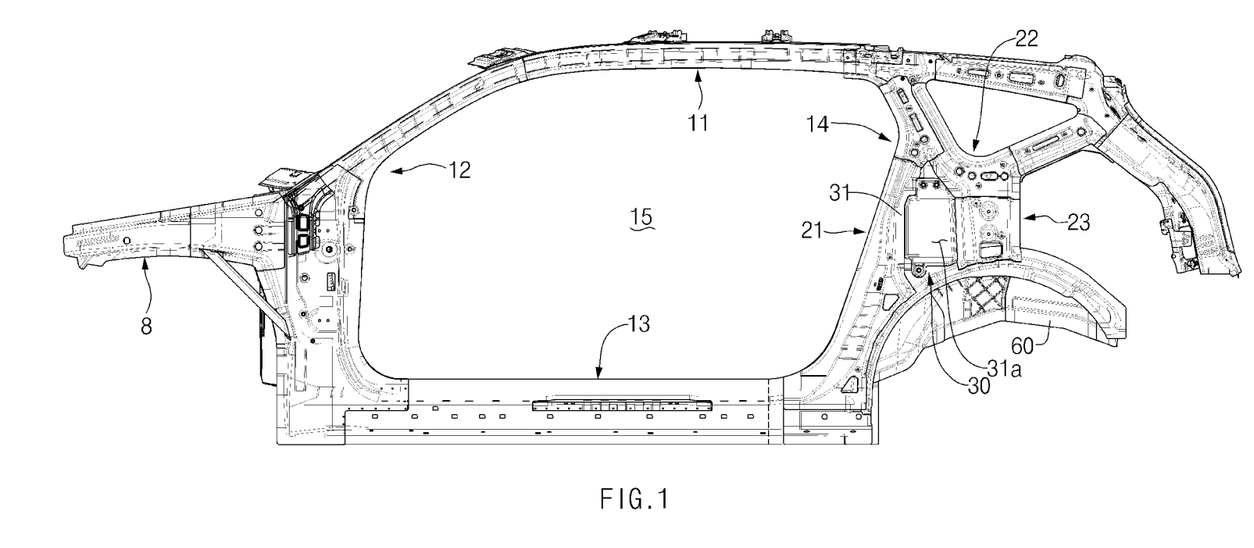
FIG. 1 illustrates a side view of a vehicle body to which a vehicle rear structure according to an exemplary embodiment of the present disclosure is applied.

Referring to FIG. 1, a vehicle body according to an exemplary embodiment of the present disclosure may include a roof structure including a roof side rail 11, a front structure including a front pillar 12, a rear structure including a rear pillar 14, and a floor structure including a side sill 13.

The roof structure may include a pair of roof side rails 11 spaced apart from each other in a width direction of the vehicle, a plurality of roof cross-members connecting the pair of roof side rails, and a roof panel supported by the pair of roof side rails and the plurality of roof cross-members. In FIG. 1, only a left roof side rail is shown, and a right roof side rail is not shown. The roof structure including the roof side rails 11 may be located on the top of the vehicle.

The front structure may include a dash panel extending in the width direction of the vehicle, and a pair of front pillars 12 connected to both sides of the dash panel, respectively. In FIG. 1, only a left front pillar is shown, and a right front pillar is not shown. Each front pillar 12 may be connected to a front portion of the corresponding roof side rail 11. A fender apron member 8 may extend from the front pillar 12 toward the front of the vehicle. The front structure including the front pillars 12 may be located on the front of the vehicle.

The rear structure may include a pair of rear pillars 14 spaced apart from each other in the width direction of the vehicle. In FIG. 1, only a left rear pillar is shown, and a right rear pillar is not shown. Each rear pillar 14 may be connected to a rear portion of the corresponding roof side rail 11. The rear structure including the rear pillars 14 may be located on the rear of the vehicle.

The floor structure may include a floor forming the bottom of the vehicle body, and a pair of side sills 13 connected to both side edges of the floor, respectively. In FIG. 1, only a left side sill is shown, and a right side sill is not shown. A front portion of each side sill 13 may be connected to a lower portion of the corresponding front pillar 12, and a rear portion of the side sill 13 may be connected to a lower portion of the corresponding rear pillar 14. The floor structure including the side sills 13 may be located on the bottom of the vehicle.

A rear wheel house 50 may be directly connected to the lower portion of the rear pillar 14, and the rear wheel house 50 may include a rear wheel house outer 51 facing the exterior of the vehicle and a rear wheel house inner 52 facing a passenger compartment (the interior of the vehicle). A rear side member 60 may be located below the rear wheel house 50.

The roof side rail 11, the front pillar 12, the side sill 13, and the rear pillar 14 may define a door opening 15.

Figure 2:
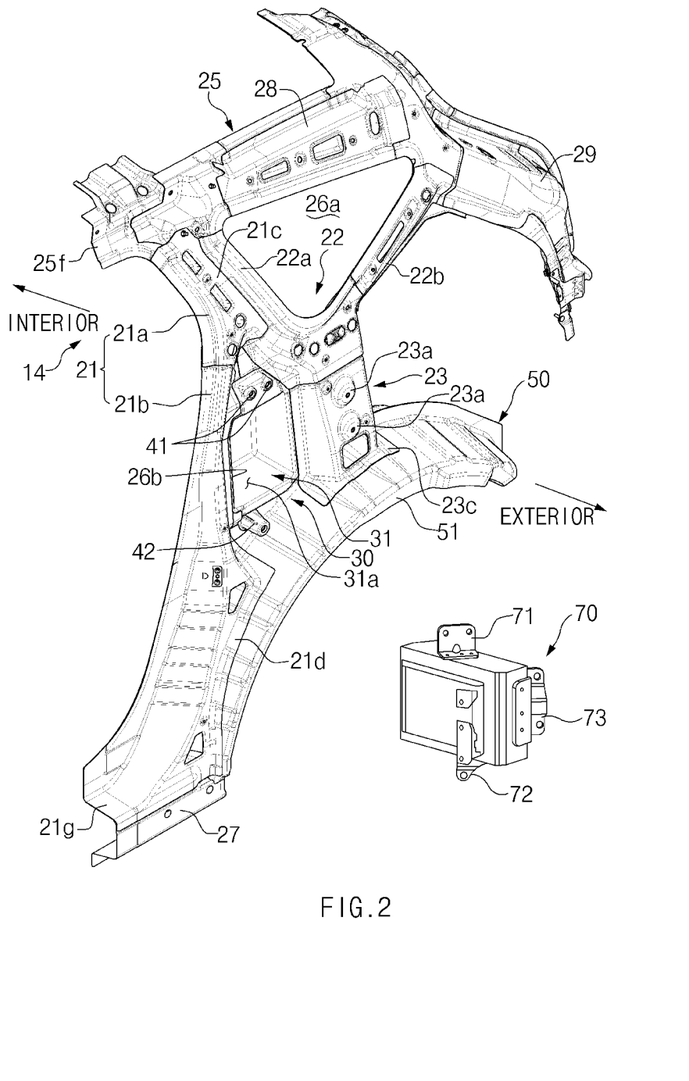
FIG. 2 illustrates the separation of a left rear pillar and a left component mounting bracket in a vehicle rear structure according to an exemplary embodiment of the present disclosure.

The vehicle rear structure according to an exemplary embodiment of the present disclosure may include the pair of rear pillars 14, and a pair of component mounting brackets 30 attached to the pair of rear pillars, respectively. In FIG. 2, the left rear pillar 14 and the left component mounting bracket 30 attached to the left rear pillar 14 are shown. A right component mounting bracket (not shown) may be attached to the right rear pillar.

The rear pillar 14 may include a rear pillar inner 25 (see FIGS. 4 and 5) facing the passenger compartment (the interior of the vehicle) and a plurality of reinforcements 21, 22, and 23 (see FIGS. 2 and 3) mounted on the rear pillar inner 25. A rear pillar outer or a side outer panel may be attached to cover the rear pillar inner 25 and the plurality of reinforcements 21, 22, and 23.

Figure 4:
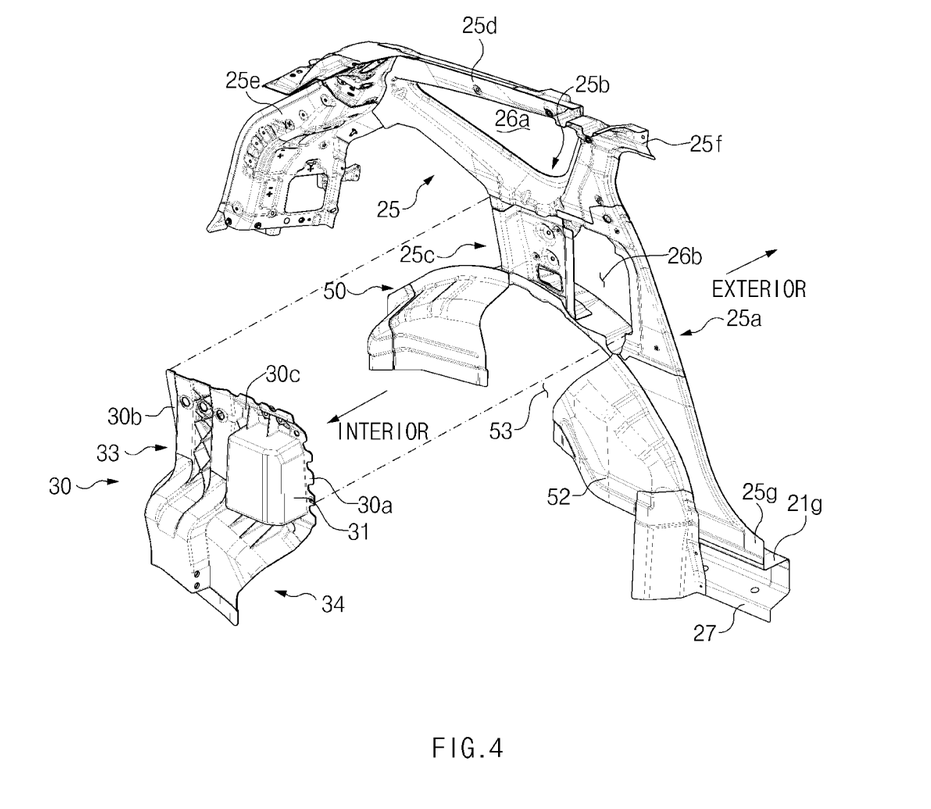
FIG. 4 illustrates a rear pillar, which is viewed from the interior (passenger compartment) of the vehicle, and a component mounting bracket, which is separated from the rear pillar, in a vehicle rear structure according to an exemplary embodiment of the present disclosure.

The rear pillar inner 25 may include an inboard-side surface facing the interior of the vehicle, and an outboard-side surface facing the exterior of the vehicle. Referring to FIG. 4, the rear pillar inner 25 may include a front portion 25a facing the front of the vehicle, a middle portion 25b connected to the front portion 25a, a lower portion 25c extending from the middle portion 25b to the rear wheel house 50, an upper portion 25d located above the middle portion 25b, and a rear portion 25e facing the rear of the vehicle. The front portion 25a may extend along a rear edge of the door opening 15. The middle portion 25b may be located between the front portion 25a and the rear portion 25e, and the middle portion 25b may extend along a lower edge of a rear window opening 26a. The lower portion 25c may extend from the middle portion 25b to the rear wheel house 50. The upper portion 25d may extend in a longitudinal direction of the roof side rail 11. The rear portion 25e may extend from the upper portion 25d.

A top end 25f of the front portion 25a may be fixed to a rear end of the roof side rail 11, and a bottom end 25g of the front portion 25a may be fixed to a rear end of the side sill 13 so that the front portion 25a may connect the roof side rail 11 and the side sill 13. Accordingly, the front portion 25a of the rear pillar inner 25 may connect between the roof side rail 11 and the side sill 13 so that the rear pillar 14 may increase the overall connectivity of the vehicle body.

Figure 5:
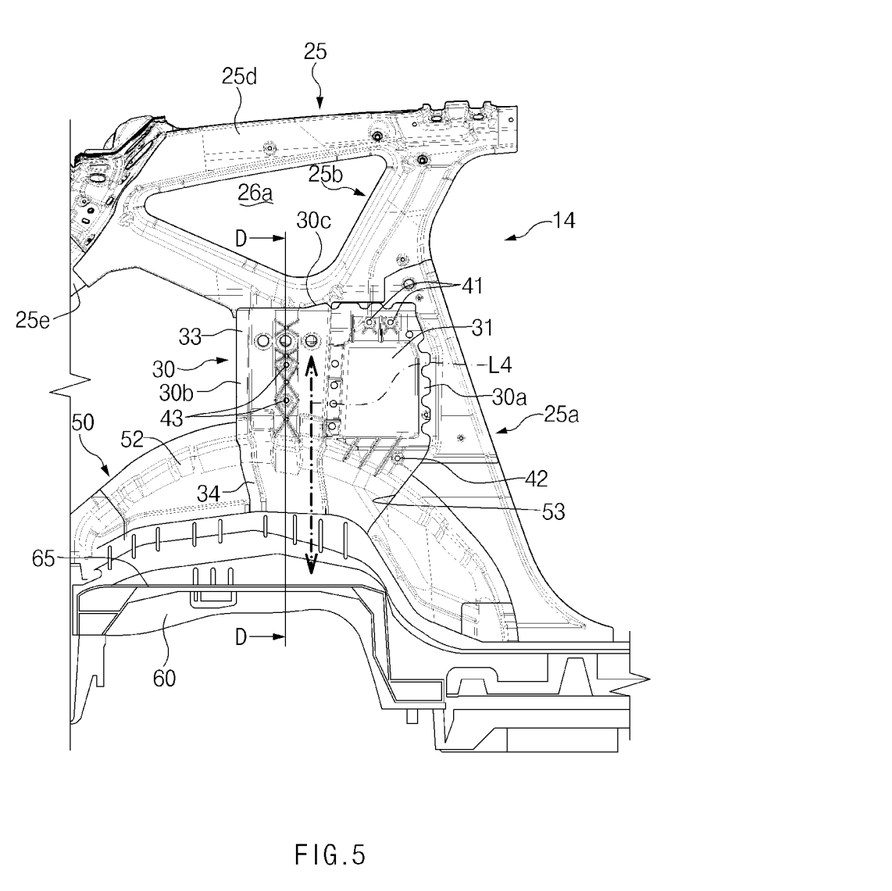
FIG. 5 illustrates a left rear pillar and a left component mounting bracket in a vehicle rear structure according to an exemplary embodiment of the present disclosure.

Referring to FIGS. 4 and 5, the rear pillar inner 25 may include the rear window opening 26a in which a rear window is mounted and an opening 26b with which a receiving portion 31 of the component mounting bracket 30 is aligned.

Figure 3:
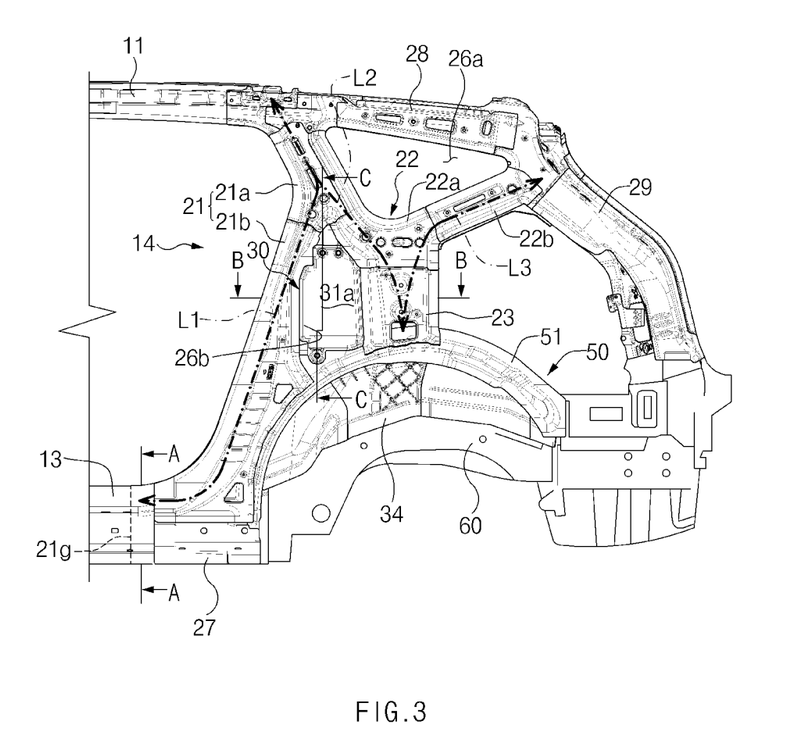
FIG. 3 illustrates a side view of a vehicle rear structure according to an exemplary embodiment of the present disclosure.

Referring to FIGS. 2 and 3, the plurality of reinforcements 21, 22, and 23 may include a front reinforcement 21, a middle reinforcement 22 connected to the front reinforcement 21, and a lower reinforcement 23 connected to the middle reinforcement 22.

The rear pillar 14 may further include an upper reinforcement 28 located above the middle reinforcement 22 and a rear reinforcement 29 located behind the middle reinforcement 22.

The front reinforcement 21 may extend along the rear edge of the door opening 15, and the front reinforcement 21 may be attached to the outboard-side surface of the front portion 25a using fasteners, welding, and/or the like to reinforce the front portion 25a of the rear pillar inner 25. As the front reinforcement 21 is attached to the front portion 25a of the rear pillar inner 25, the front reinforcement 21 may significantly increase connection stiffness between the roof side rail 11 and the side sill 13 by the rear pillar inner 25.

According to a specific exemplary embodiment, the front reinforcement 21 may include a first front reinforcement member 21a connected to the roof side rail 11 and a second front reinforcement member 21b connected to the side sill 13.

The first front reinforcement member 21a may be fixed to an upper portion of the front portion 25a of the rear pillar inner 25 using fasteners, welding, and/or the like, and accordingly the first front reinforcement member 21a may be connected to the roof side rail 11 through the rear pillar inner 25. Thus, connection stiffness between the rear pillar 14 and the roof side rail 11 may be increased by the first front reinforcement member 21a, and the overall connectivity of the vehicle body may be improved.

A top end of the second front reinforcement member 21b may be directly connected to a bottom end of the first front reinforcement member 21a. Referring to FIG. 2, the second front reinforcement member 21b may have a flange 21d fixed to the rear wheel house 50, and the flange 21d may be fixed to the rear wheel house outer 51 of the rear wheel house 50 using fasteners, welding, and/or the like. Referring to FIG. 3, a bottom end 24 of the second front reinforcement member 21b may be directly connected to the side sill 13. Thus, the connection stiffness between the rear pillar 14 and the side sill 13 may be increased by the second front reinforcement member 21b, and the overall connectivity of the vehicle body may be improved.

Figure 6:
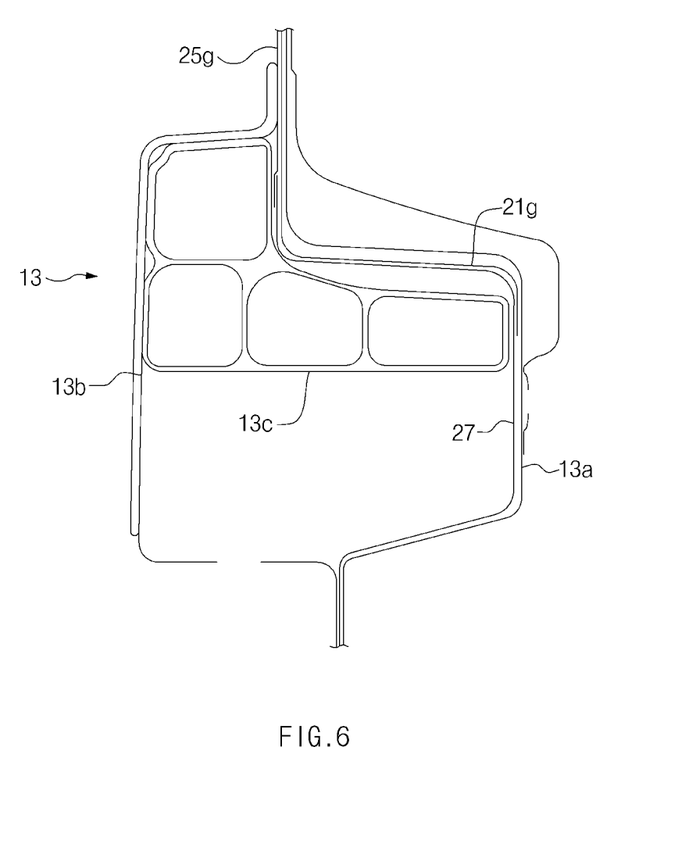
FIG. 6 illustrates a cross-sectional view, taken along line A-A of FIG. 3.

Referring to FIG. 6, the side sill 13 may include a side sill inner 13b facing the interior of the vehicle, a side sill outer 13a facing the exterior of the vehicle, and a side sill reinforcement 13c disposed between the side sill inner 13b and the side sill outer 13a. The bottom end 21g of the second front reinforcement member 21b may be fixed to the bottom end 25g of the front portion 25a of the rear pillar inner 25 using fasteners, welding, and/or the like. A reinforcing member 27 may be fixed to the bottom end 21g of the second front reinforcement member 21b using fasteners, welding, and/or the like. The bottom end 21g of the second front reinforcement member 21b may have an L-shaped cross section, and the reinforcing member 27 may have a channel-shaped cross section. The bottom end 21g of the second front reinforcement member 21b may partially overlap the reinforcing member 27. The bottom end 21g of the second front reinforcement member 21b and the reinforcing member 27 may partially overlap and be attached to an inboard-side surface of the side sill outer 13a of the side sill 13. The bottom end 21g of the second front reinforcement member 21b may be sandwiched between the reinforcing member 27 and the side sill outer 13a so that the bottom end 21g of the second front reinforcement member 21b may be firmly connected to the side sill 13. Accordingly, the bottom end of the rear pillar 14 may be connected to the side sill 13 through the front reinforcement 21 and the reinforcing member 27 so that the connection stiffness between the rear pillar 14 and the side sill 13 may be increased, and thus the overall connectivity of the vehicle body may be improved.

According to an exemplary embodiment, the first front reinforcement member 21a and the second front reinforcement member 21b may be individually manufactured, and each of the first front reinforcement member 21a and the second front reinforcement member 21b may be fixed to the outboard-side surface of the rear pillar inner 25 using fasteners, welding, and/or the like. The bottom end of the first front reinforcement member 21a may be fixed to the top end of the second front reinforcement member 21b using fasteners, welding, and/or the like.

According to another exemplary embodiment, the first front reinforcement member 21a and the second front reinforcement member 21b may be manufactured by casting, pressing, or the like to form a unitary one-piece structure. The first front reinforcement member 21a and the second front reinforcement member 21b may be fixed together to the outboard-side surface of the rear pillar inner 25 using fasteners, welding, and/or the like.

The middle reinforcement 22 may be curved from the front reinforcement 21 toward the rear of the vehicle. The middle reinforcement 22 may extend along the lower edge of the rear window opening 26a.

The middle reinforcement 22 may be attached to the outboard-side surface of the middle portion 25b using fasteners, welding, and/or the like to reinforce the middle portion 25b of the rear pillar inner 25. The middle reinforcement 22 may extend along the lower edge of the rear window opening 26a of the rear pillar inner 25. In particular, the middle reinforcement 22 may be curved to match the contour of the lower edge of the rear window opening 26a.

According to a specific exemplary embodiment, the middle reinforcement 22 may include a first middle reinforcement member 22a connected to the first front reinforcement member 21a of the front reinforcement 21 and a second middle reinforcement member 22b connected to the first middle reinforcement member 22a.

The first front reinforcement member 21a may extend diagonally from the rear of the roof side rail 11 toward the bottom of the vehicle, and the first front reinforcement member 21a may have an overlap portion 21c partially overlapping the first middle reinforcement member 22a. The overlap portion 21c of the first front reinforcement member 21a may be attached to a front portion of the first middle reinforcement member 22a using fasteners, welding, and/or the like. The first front reinforcement member 21a may partially overlap and be attached to the first middle reinforcement member 22a so that connection stiffness between the front reinforcement 21 and the middle reinforcement 22 may be achieved.

The second middle reinforcement member 22b may extend diagonally from the first front reinforcement member 21a toward the top of the vehicle. A front end of the second middle reinforcement member 22b may be connected to a rear end of the first middle reinforcement member 22a, and a rear end of the second middle reinforcement member 22b may be connected to the rear reinforcement 29.

According to an exemplary embodiment, the first middle reinforcement member 22a and the second middle reinforcement member 22b may be individually manufactured, and each of the first middle reinforcement member 22a and the second middle reinforcement member 22b may be fixed to the outboard-side surface of the rear pillar inner 25 using fasteners, welding, and/or the like. The rear end of the first middle reinforcement member 22a may be fixed to the front end of the second middle reinforcement member 22b using fasteners, welding, and/or the like.

According to another exemplary embodiment, the first middle reinforcement member 22a and the second middle reinforcement member 22b may be manufactured by casting, pressing, or the like to form a unitary one-piece structure. The first middle reinforcement member 22a and the second middle reinforcement member 22b may be fixed together to the outboard-side surface of the rear pillar inner 25 using fasteners, welding, and/or the like.

The lower reinforcement 23 may be attached to the outboard-side surface of the lower portion 25c using fasteners, welding, and/or the like to reinforce the lower portion 25c of the rear pillar inner 25. The lower reinforcement 23 may extend from a joint portion between the first middle reinforcement member 22a and the second middle reinforcement member 22b to the rear wheel house 50. The lower reinforcement 23 may have a bottom flange 23c fixed to the rear wheel house 50, and the bottom flange 23c of the lower reinforcement 23 may be fixed to the rear wheel house outer 51 of the rear wheel house 50 using fasteners, welding, and/or the like.

The upper reinforcement 28 may be attached to the outboard-side surface of the upper portion 25d using fasteners, welding, and/or the like to reinforce at least a portion of the upper portion 25d of the rear pillar inner 25.

The rear reinforcement 29 may be attached to the outboard-side surface of the rear portion 25e using fasteners, welding, and/or the like to reinforce at least a portion of the rear portion 25e of the rear pillar inner 25.

Referring to FIG. 3, the front reinforcement 21 may extend along the rear edge of the door opening 15 of the vehicle, the top end of the front reinforcement 21 may be connected to the rear end of the roof side rail 11, and the bottom end of the front reinforcement 21 may be connected to the rear end of the side sill 13, and thus the front reinforcement 21 may define a first load path L1 along the rear edge of the door opening 15. The first middle reinforcement member 22a of the middle reinforcement 22 may be diagonally connected to an upper portion of the front reinforcement 21, and the lower reinforcement 23 may be connected to the first middle reinforcement member 22a of the middle reinforcement 22 in a height direction of the vehicle so that the first middle reinforcement member 22a of the middle reinforcement 22 and the lower reinforcement 23 may define a second load path L2.

The lower reinforcement 23 may be connected to the second middle reinforcement member 22b of the middle reinforcement 22 so that the second middle reinforcement member 22b of the middle reinforcement 22 and the lower reinforcement 23 may define a third load path L3. The first load path L1, the second load path L2, and the third load path L3 may form N-shaped load paths L1, L2, and L3. That is, the front reinforcement 21, the middle reinforcement 22, and the lower reinforcement 23 may define the N-shaped load paths L1, L2, and L3 around the component mounting bracket 30 so that a load generated by a vehicle component 70 mounted in the component mounting bracket 30 may be distributed through the N-shaped load paths L1, L2, and L3, and thus strength and torsional stiffness of the rear pillar 14 may be increased, and the vehicle component 70 may be stably supported to prevent the sagging of a rear door.

Referring to FIGS. 2 to 5, the vehicle rear structure according to an exemplary embodiment of the present disclosure may include the component mounting bracket 30 fixed to the rear pillar 14. The component mounting bracket 30 may be attached to the inboard-side surface of the rear pillar inner 25 and the rear wheel house 50, and the component mounting bracket 30 may be configured to fix the vehicle component 70 such as a rear door hinge.

Referring to FIG. 2, the vehicle component 70 may include an upper flange 71 provided on a top surface of the vehicle component 70, a lower flange 72 provided on a bottom surface of the vehicle component 70, and a rear flange 73 provided on a rear surface of the vehicle component 70. For example, the vehicle component 70 may be a dual-motion rear door hinge configured to provide slide motion and swing motion, and the dual-motion rear door hinge may have a relatively complex structure with increased volume and weight.

Figure 7:
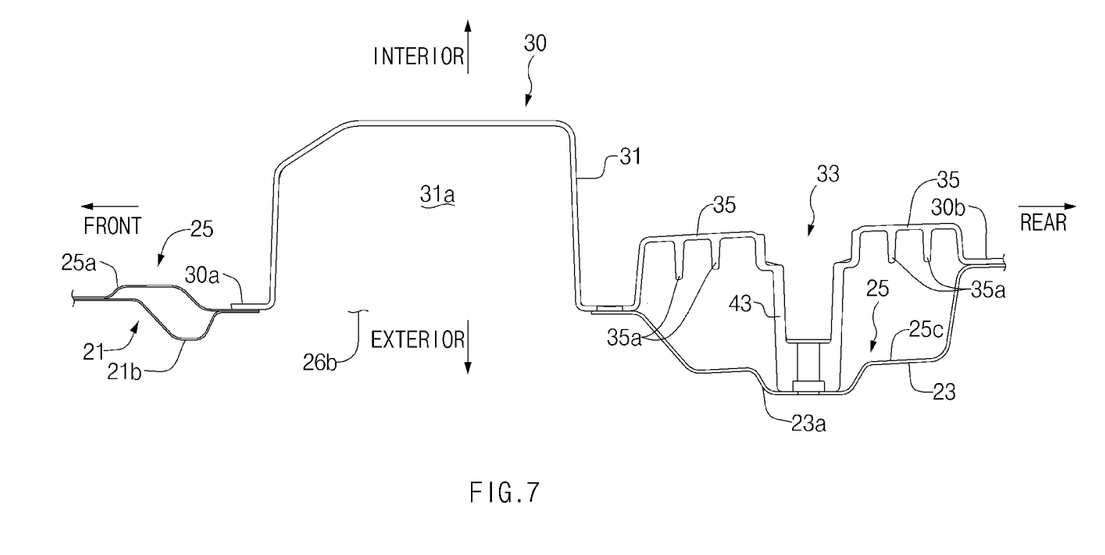
FIG. 7 illustrates a cross-sectional view, taken along line B-B of FIG. 3.
Figure 8:
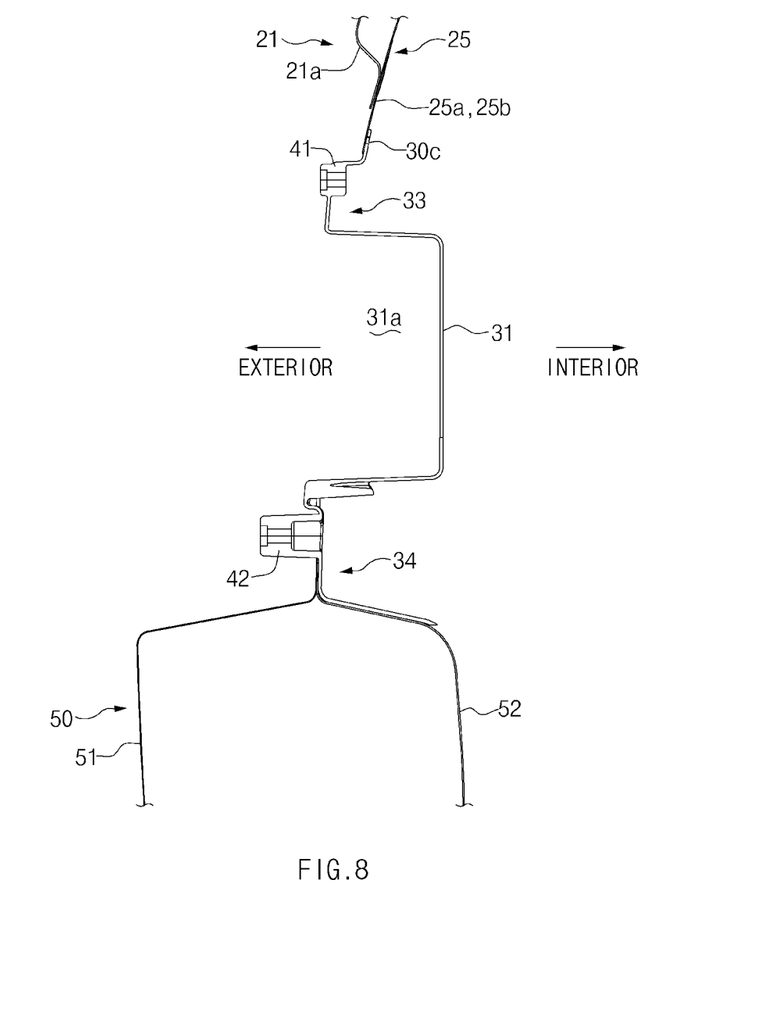
FIG. 8 illustrates a cross-sectional view, taken along line C-C of FIG. 3.
Figure 10:
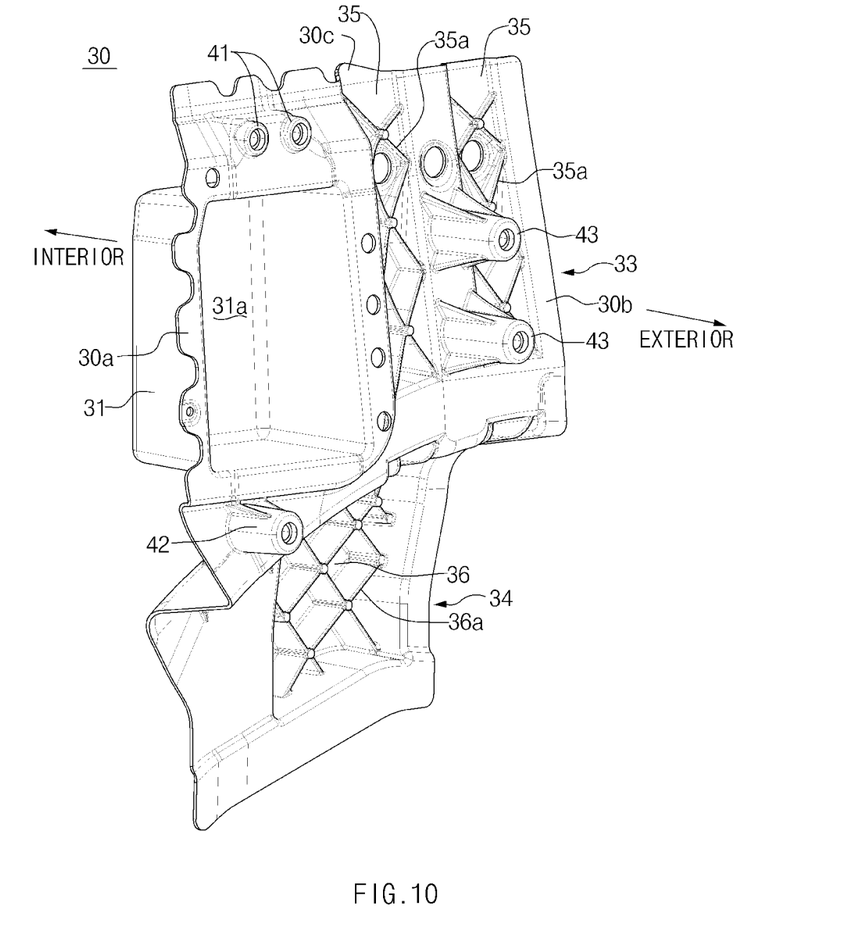
FIG. 10 illustrates a perspective view of a component mounting bracket in a vehicle rear structure according to an exemplary embodiment of the present disclosure, which is viewed from the exterior of the vehicle.
Figure 11:
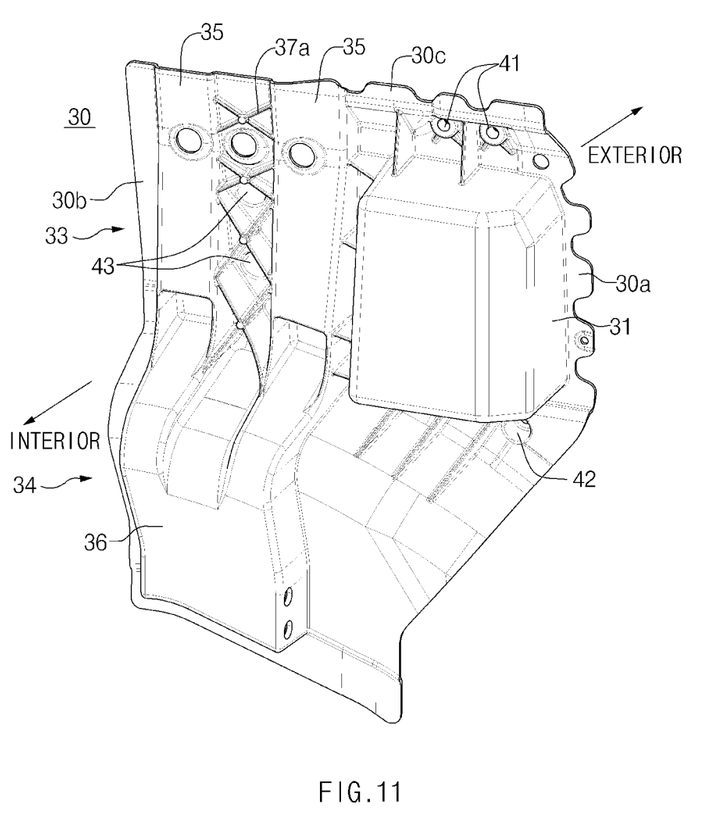
FIG. 11 illustrates a perspective view of a component mounting bracket in a vehicle rear structure according to an exemplary embodiment of the present disclosure, which is viewed from the interior of the vehicle.

Referring to FIGS. 10 and 11, the component mounting bracket 30 may include a front flange 30a facing the front of the vehicle, a rear flange 30b facing the rear of the vehicle, and an upper flange 30c facing the top of the vehicle. Referring to FIGS. 4 and 7, the front flange 30a may be fixed to the front portion 25a of the rear pillar inner 25 using fasteners, welding, and/or the like, and the rear flange 30b may be fixed to the lower portion 25c of the rear pillar inner 25 using fasteners, welding, and/or the like. Referring to FIGS. 4 and 8, the upper flange 30c may be fixed to the middle portion 25b and the front portion 25a of the rear pillar inner 25 using fasteners, welding, and/or the like.

Referring to FIGS. 10 and 11, the component mounting bracket 30 may include an upper attachment portion 33 extending in the height direction of the vehicle. The upper attachment portion 33 may have an upper recessed portion 35, and the upper recessed portion 35 may be recessed from the upper attachment portion 33 toward the interior of the vehicle. The upper recessed portion 35 may have a cavity defined therein, and the cavity of the upper recessed portion 35 may be opened to the exterior of the vehicle (that is, the inboard-side surface of the rear pillar inner 25). A plurality of first upper reinforcing ribs 35a may be formed in the cavity of the upper recessed portion 35, and the plurality of first upper reinforcing ribs 35a may face the exterior of the vehicle. Referring to FIG. 11, two upper recessed portions 35 may be provided in the upper attachment portion 33, and a plurality of second upper reinforcing ribs 37a may be formed between the two upper recessed portions 35. The plurality of second upper reinforcing ribs 37a may face the interior of the vehicle. Accordingly, strength and stiffness of the upper attachment portion 33 may be increased by the upper recessed portions 35, the plurality of first upper reinforcing ribs 35a, and the plurality of second upper reinforcing ribs 37a.

The front flange 30a may be provided on a front edge of the upper attachment portion 33, the rear flange 30b may be provided on a rear edge of the upper attachment portion 33, and the upper flange 30c may be provided on a top edge of the upper attachment portion 33. The front flange 30a may be fixed to the front portion 25a of the rear pillar inner 25, the rear flange 30b may be fixed to the lower portion 25c of the rear pillar inner 25, and the upper flange 30c may be fixed to the middle portion 25b and the front portion 25a of the rear pillar inner 25 so that the upper attachment portion 33 may be firmly attached to the rear pillar inner 25.

Referring to FIGS. 10 and 11, the component mounting bracket 30 may include the receiving portion 31 in which at least a portion of the vehicle component 70 is received, and the receiving portion 31 may be recessed from the upper attachment portion 33 toward the interior of the vehicle so that the receiving portion 31 may have a cavity 31a, and the cavity 31a of the receiving portion 31 may be opened to the exterior of the vehicle. At least a portion of the vehicle component 70 may be received in the cavity 31a of the receiving portion 31 so that the vehicle component 70 may be located into the interior of the vehicle, and protruding of the vehicle component 70 from the exterior of the vehicle may be minimized. The receiving portion 31 may include a top wall facing the top of the vehicle, a bottom wall facing the bottom of the vehicle, a front wall facing the front of the vehicle, and a rear wall facing the rear of the vehicle. The top wall, the bottom wall, the front wall, and the rear wall may define the cavity 31a. At least a portion of the vehicle component 70 may be received in the cavity 31a of the receiving portion 31, and accordingly the top wall, the bottom wall, the front wall, and the rear wall of the receiving portion 31 may support the vehicle component 70 in four directions.

Referring to FIGS. 2 and 3, the receiving portion 31 may be aligned with the opening 26b of the rear pillar inner 25, and accordingly the cavity 31a of the receiving portion 31 may be exposed to the exterior of the vehicle through the opening 26b. The front reinforcement 21 may be located in front of the receiving portion 31 of the component mounting bracket 30, the middle reinforcement 22 may be located above the receiving portion 31 of the component mounting bracket 30, and the lower reinforcement 23 may be located behind the receiving portion 31 of the component mounting bracket 30. In particular, the front reinforcement 21, the middle reinforcement 22, and the lower reinforcement 23 may define a space aligned with the opening 26b of the rear pillar inner 25 and the receiving portion 31.

Referring to FIGS. 10 and 11, the component mounting bracket 30 may include a lower attachment portion 34 extending downwardly from the upper attachment portion 33. The lower attachment portion 34 may have a lower recessed portion 36, and the lower recessed portion 36 may be recessed from the lower attachment portion 34 toward the interior of the vehicle. The lower recessed portion 36 may have a cavity defined therein, and the cavity of the lower recessed portion 36 may be opened to the exterior of the vehicle. A plurality of lower reinforcing ribs 36a may be formed in the cavity of the lower recessed portion 36, and the plurality of lower reinforcing ribs 36a may face the exterior of the vehicle. Accordingly, strength and stiffness of the lower attachment portion 34 may be increased by the lower recessed portion 36 and the plurality of lower reinforcing ribs 36a.

Referring to FIG. 4, the rear wheel house inner 52 of the rear wheel house 50 may have an opening 53, and the lower attachment portion 34 of the component mounting bracket 30 may be fitted into the opening 53 of the rear wheel house inner 52. An edge of the lower attachment portion 34 may be fixed to a portion of the rear wheel house inner 52 adjacent to the opening 53 using fasteners, welding, and/or the like. Accordingly, the lower attachment portion 34 may form a portion of the rear wheel house 50.

Referring to FIGS. 10 and 11, the component mounting bracket 30 may include an upper mounting boss 41 located above the receiving portion 31, a lower mounting boss 42 located below the receiving portion 31, and a rear mounting boss 43 located behind the receiving portion 31. Referring to FIGS. 8 and 10, the upper mounting boss 41 may protrude from the upper attachment portion 33 toward the exterior of the vehicle, and the lower mounting boss 42 may protrude from the lower attachment portion 34 toward the exterior of the vehicle. Referring to FIGS. 7 and 10, the rear mounting boss 43 may protrude from the upper attachment portion 33 toward the exterior of the vehicle. The number and shape of the upper mounting boss 41, the number and shape of the lower mounting boss 42, and the number and shape of the rear mounting boss 43 may be varied according to the structure, weight, and the like of the vehicle component 70. For example, as illustrated in FIGS. 10 and 11, two upper mounting bosses 41, one lower mounting boss 42, and two rear mounting bosses 43 may be provided.

Referring to FIG. 7, the upper attachment portion 33 may be fixed to the front portion 25a and the lower portion 25c of the rear pillar inner 25 using fasteners, welding, and/or the like. In particular, the front flange 30a may be fixed to an edge of the front portion 25a of the rear pillar inner 25 and an edge of the second front reinforcement member 21b of the front reinforcement 21 using fasteners, welding, and/or the like. The lower reinforcement 23 may have a boss 23a protruding toward the exterior of the vehicle, and the boss 23a may be attached to the rear mounting boss 43 of the component mounting bracket 30. A hole of the boss 23a may be aligned with a mounting hole of the rear mounting boss 43. The receiving portion 31 may be aligned with the opening 26b of the rear pillar inner 25, and the cavity 31a of the receiving portion 31 may be opened to the exterior of the vehicle through the opening 26b.

The upper flange 71 of the vehicle component 70 may be fixed to the upper mounting boss 41 using fasteners, welding, and/or the like, the lower flange 72 of the vehicle component 70 may be fixed to the lower mounting boss 42 using fasteners, welding, and/or the like, and the rear flange 73 of the vehicle component 70 may be fixed to the rear mounting boss 43 using fasteners, welding, and/or the like. The upper flange 71 may have two mounting holes corresponding to the two upper mounting bosses 41, and the mounting holes of the upper flange 71 may be aligned with mounting holes of the corresponding upper mounting bosses 41, respectively. Bolts may be fitted into the mounting holes of the upper flange 71 and the mounting holes of the corresponding upper mounting bosses 41 so that the upper flange 71 of the vehicle component 70 may be fixed to the upper mounting bosses 41 of the component mounting bracket 30.

The lower flange 72 may have one mounting hole corresponding to one lower mounting boss 42, and the mounting hole of the lower flange 72 may be aligned with a mounting hole of the lower mounting boss 42. A bolt may be fitted into the mounting hole of the lower flange 72 and the mounting hole of the lower mounting boss 42 so that the lower flange 72 of the vehicle component 70 may be fixed to the lower mounting boss 42 of the component mounting bracket 30. The rear flange 73 may have two mounting holes corresponding to the two rear mounting bosses 43, and the mounting holes of the rear flange 73 may be aligned with mounting holes of the corresponding rear mounting bosses 43, respectively. Bolts may be fitted into the mounting holes of the rear flange 73 and the mounting holes of the corresponding rear mounting bosses 43 so that the rear flange 73 of the vehicle component 70 may be fixed to the rear mounting bosses 43 of the component mounting bracket 30. Since a relatively high load acts on upper and rear portions of the vehicle component 70, the number of the mounting holes of the upper flange 71 and the number of the upper mounting bosses 41 may be two, and the number of the mounting holes of the rear flange 73 and the number of the rear mounting bosses 43 may be two.

The upper, lower, and rear portions of the vehicle component 70 may be mounted in the component mounting bracket 30, and the front flange 30a of the component mounting bracket 30 may be firmly fixed to the rear pillar 14 so that the vehicle component 70 may be firmly supported by the component mounting bracket 30 and the rear pillar 14. In particular, the vehicle component 70 may be supported by the component mounting bracket 30 and the rear pillar 14 in a plurality of directions, and thus mounting stiffness of the vehicle component 70 may be improved.

According to an exemplary embodiment, the component mounting bracket 30 may be manufactured by die-casting an aluminum material, and accordingly the component mounting bracket 30 may form a unitary one-piece structure.

Figure 9:
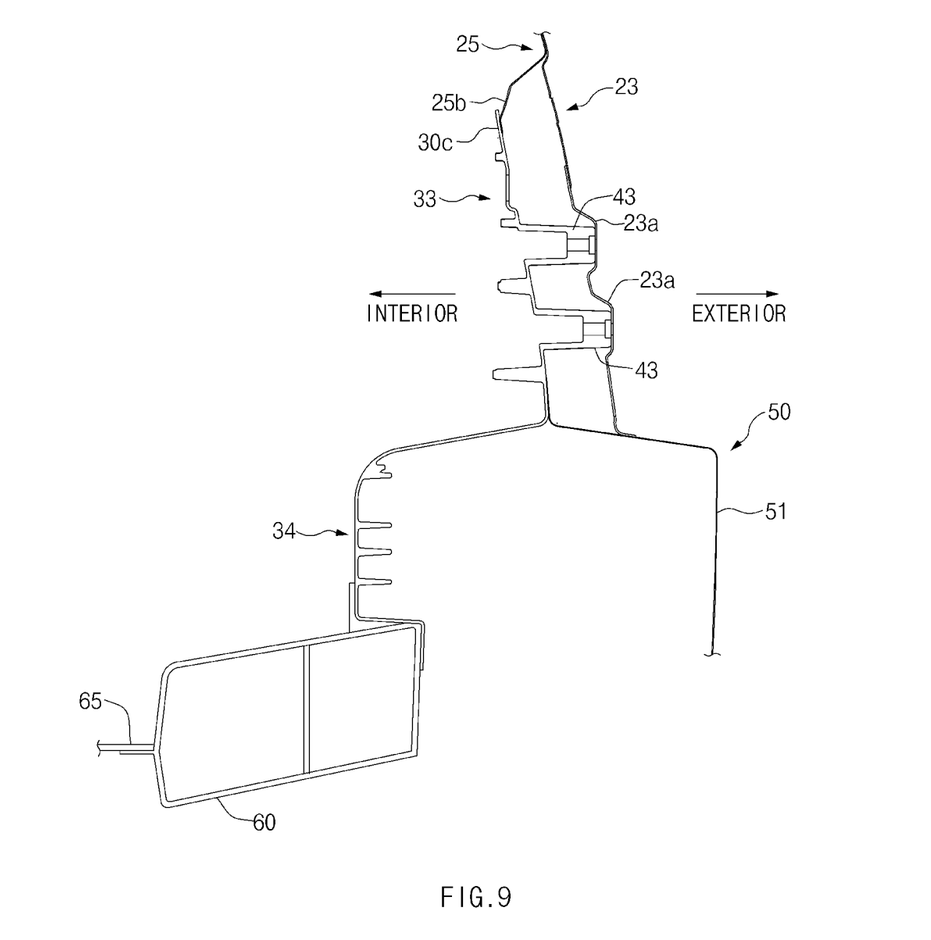
FIG. 9 illustrates a cross-sectional view, taken along line D-D of FIG. 5.

Referring to FIGS. 5 and 9, the rear side member 60 may be connected to the rear wheel house 50, and a floor 65 may be connected to the rear side member 60. A lower portion of the lower attachment portion 34 of the component mounting bracket 30 may be fixed to the rear side member 60 using fasteners, welding, and/or the like. The component mounting bracket 30 may be connected to the rear wheel house 50 and the rear side member 60 so that a fourth load path L4 may be defined by the component mounting bracket 30 along the height direction of the vehicle, and a load applied to the rear pillar 14 may be transferred to the rear side member 60 and the floor 65 through the component mounting bracket 30.

The vehicle rear structure according to exemplary embodiments of the present disclosure may be applied to a center pillarless vehicle, and the dual-motion rear door hinge may be mounted in the component mounting bracket 30 so that a coach door in the center pillarless vehicle may easily open and close independently of a front door.

As set forth above, according to exemplary embodiments of the present disclosure, the component mounting bracket may be disposed in a space between the plurality of reinforcements, and the plurality of reinforcements may define the load paths around the component mounting bracket in various directions so that a relatively heavy vehicle component such as a rear door hinge may be stably supported, and a load may be distributed and transferred in various directions (through the N-shaped load paths), and thus the torsional stiffness of the rear pillar may be increased, and the sagging of the rear door may be prevented.

According to exemplary embodiments of the present disclosure, the component mounting bracket may be firmly supported by the rear pillar, and the component mounting bracket may support the vehicle component in the plurality of directions so that the vehicle component may be stably supported by the rear structure.

The vehicle rear structure according to exemplary embodiments of the present disclosure may be applied to a center pillarless vehicle, and the dual-motion rear door hinge may be mounted in the component mounting bracket to thereby facilitate independent opening and closing of the coach door in the center pillarless vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle rear structure comprising:
a rear pillar comprising a rear pillar inner and a plurality of reinforcements mounted on the rear pillar inner; and
a component mounting bracket attached to the rear pillar and having a receiving portion in which a portion of a vehicle component is received, wherein the plurality of reinforcements are disposed to surround the component mounting bracket;
wherein the plurality of reinforcements comprise a front reinforcement located in front of the receiving portion of the component mounting bracket, a middle reinforcement located above the receiving portion of the component mounting bracket, and a lower reinforcement located behind the receiving portion of the component mounting bracket;
wherein a top end of the rear pillar is connected to a roof side rail of a vehicle;
wherein a bottom end of the rear pillar is connected to a side sill of the vehicle;
wherein the front reinforcement extends along a rear edge of a door opening of the vehicle; and
wherein a bottom end of the front reinforcement is fixed to the side sill.

2. The vehicle rear structure according to claim 1, wherein the receiving portion is recessed from the component mounting bracket toward an interior of a vehicle.

3. The vehicle rear structure according to claim 1, wherein:
a reinforcing member is fixed to the bottom end of the front reinforcement;
the reinforcing member and the bottom end of the front reinforcement are fixed to the side sill; and
the reinforcing member and the side sill are configured to sandwich a portion of the bottom end of the front reinforcement.

4. The vehicle rear structure according to claim 1, wherein the front reinforcement, the middle reinforcement, and the lower reinforcement define N-shaped load paths around the component mounting bracket.

5. The vehicle rear structure according to claim 1, wherein:
the rear pillar inner has an opening aligned with the receiving portion; and
the front reinforcement, the middle reinforcement, and the lower reinforcement define a space aligned with the opening of the rear pillar inner and the receiving portion.

6. A vehicle rear structure comprising:
a rear pillar comprising a rear pillar inner and a plurality of reinforcements mounted on the rear pillar inner; and
a component mounting bracket attached to the rear pillar, wherein the plurality of reinforcements are disposed to surround the component mounting bracket, the component mounting bracket comprising:
an upper attachment portion attached to the rear pillar inner; and
a receiving portion recessed from the upper attachment portion toward an interior of a vehicle to define a cavity in the receiving portion into which a portion of a vehicle component is received;
a front flange provided on a front edge of the upper attachment portion;
an upper flange provided on a top edge of the upper attachment portion; and
a rear flange provided on a rear edge of the upper attachment portion.

7. The vehicle rear structure according to claim 6, wherein the upper attachment portion is attached to the rear pillar inner through the front flange, the upper flange, and the rear flange.

8. The vehicle rear structure according to claim 6, further comprising a rear wheel house connected to a lower portion of the rear pillar, wherein the component mounting bracket further comprises a lower attachment portion that extends downwardly from the upper attachment portion and is attached to the rear wheel house.

9. The vehicle rear structure according to claim 8, wherein the rear wheel house has an opening into which the lower attachment portion is fitted.

10. The vehicle rear structure according to claim 8, wherein the component mounting bracket further comprises an upper mounting boss located above the receiving portion, a lower mounting boss located below the receiving portion, and a rear mounting boss located behind the receiving portion.

11. The vehicle rear structure according to claim 10, wherein:
the upper mounting boss protrudes from the upper attachment portion toward an exterior of the vehicle;
the lower mounting boss protrudes from the lower attachment portion toward the exterior of the vehicle; and
the rear mounting boss protrudes from the upper attachment portion toward the exterior of the vehicle.

12. The vehicle rear structure according to claim 10, wherein the upper flange is fixed to the upper mounting boss, a lower flange is fixed to the lower mounting boss, and the rear flange is fixed to the rear mounting boss.

13. The vehicle rear structure according to claim 8, further comprising a rear side member located below the rear wheel house, wherein a lower portion of the lower attachment portion is fixed to the rear side member.

14. A vehicle body comprising:
a roof side rail extending in a longitudinal direction of the vehicle body in an upper region of the vehicle body;
a side sill extending in the longitudinal direction of the vehicle body in a lower region of the vehicle body;
a rear pillar comprising a rear pillar inner and a plurality of reinforcements mounted on the rear pillar inner, wherein a top end of the rear pillar is attached to the roof side rail and a bottom end of the rear pillar is attached to the side sill; and
a component mounting bracket attached to the rear pillar and having a receiving portion recessed from the component mounting bracket toward an interior of the vehicle body, wherein a portion of a vehicle component is received in the receiving portion;
wherein the plurality of reinforcements surround the component mounting bracket; and
wherein the plurality of reinforcements comprise:
a front reinforcement located in front of the receiving portion of the component mounting bracket and extending along a rear edge of a door opening of the vehicle body, wherein a bottom end of the front reinforcement is fixed to the side sill;
a middle reinforcement located above the receiving portion of the component mounting bracket; and
a lower reinforcement located behind the receiving portion of the component mounting bracket.

15. The vehicle body according to claim 14, wherein:
a reinforcing member is fixed to the bottom end of the front reinforcement;
the reinforcing member and the bottom end of the front reinforcement are fixed to the side sill; and
the reinforcing member and the side sill are configured to sandwich a portion of the bottom end of the front reinforcement.

16. The vehicle body according to claim 14, wherein:
the rear pillar inner has an opening aligned with the receiving portion; and
the front reinforcement, the middle reinforcement, and the lower reinforcement define a space aligned with the opening of the rear pillar inner and the receiving portion.

17. The vehicle rear structure according to claim 1, wherein a reinforcing member is fixed to the bottom end of the front reinforcement.

18. The vehicle rear structure according to claim 17, wherein the reinforcing member and the bottom end of the front reinforcement are fixed to the side sill.

19. The vehicle rear structure according to claim 17, wherein the reinforcing member and the side sill are configured to sandwich a portion of the bottom end of the front reinforcement.

20. The vehicle rear structure according to claim 1, wherein the rear pillar inner has an opening aligned with the receiving portion.

\* \* \* \* \*